United States Patent [19]

Wilson

[11] Patent Number: 4,549,386
[45] Date of Patent: Oct. 29, 1985

[54] FORM-FILL-SEAL WRAPPING APPARATUS

[75] Inventor: Peter G. Wilson, Leeds, England

[73] Assignee: Baker Perkins Holdings PLC, Peterborough, England

[21] Appl. No.: 598,812

[22] Filed: Apr. 10, 1984

[30] Foreign Application Priority Data

Apr. 18, 1983 [GB] United Kingdom ............... 83010440
Apr. 18, 1983 [GB] United Kingdom ............... 83010441

[51] Int. Cl.⁴ ..................... B65B 57/00; B65B 59/02; B65B 51/26
[52] U.S. Cl. .......................................... 53/51; 53/550; 53/373
[58] Field of Search ............... 53/51, 550, 55, 551, 53/373; 156/359, 360, 361, 362, 366

[56] References Cited

U.S. PATENT DOCUMENTS

| | | | |
|---|---|---|---|
| 3,140,573 | 7/1964 | Buttolph | 53/51 |
| 3,850,780 | 11/1974 | Crawford et al. | 53/550 X |
| 3,861,983 | 1/1975 | Harrell | 53/51 X |
| 4,106,265 | 8/1978 | Aterianus | 53/550 |
| 4,381,637 | 5/1983 | Ballestrazzi et al. | 53/51 |

Primary Examiner—Horace M. Culver
Attorney, Agent, or Firm—Watson, Cole, Grindle & Watson

[57] ABSTRACT

Microprocessor 60 controlled form-fill-seal apparatus has an infeed conveyor 13, web advance and longitudinal sealing unit 19 and transverse sealing jaws 20 and 21 each of which is driven by its own separate motor M1, M2 and M3 respectively. The microprocessor maintains the operation of the motors in synchronism. The movement of the jaws is modulated in accordance with a selected pattern (15) drawn from a library 73 of modulation patterns available to the microprocessor.

8 Claims, 5 Drawing Figures

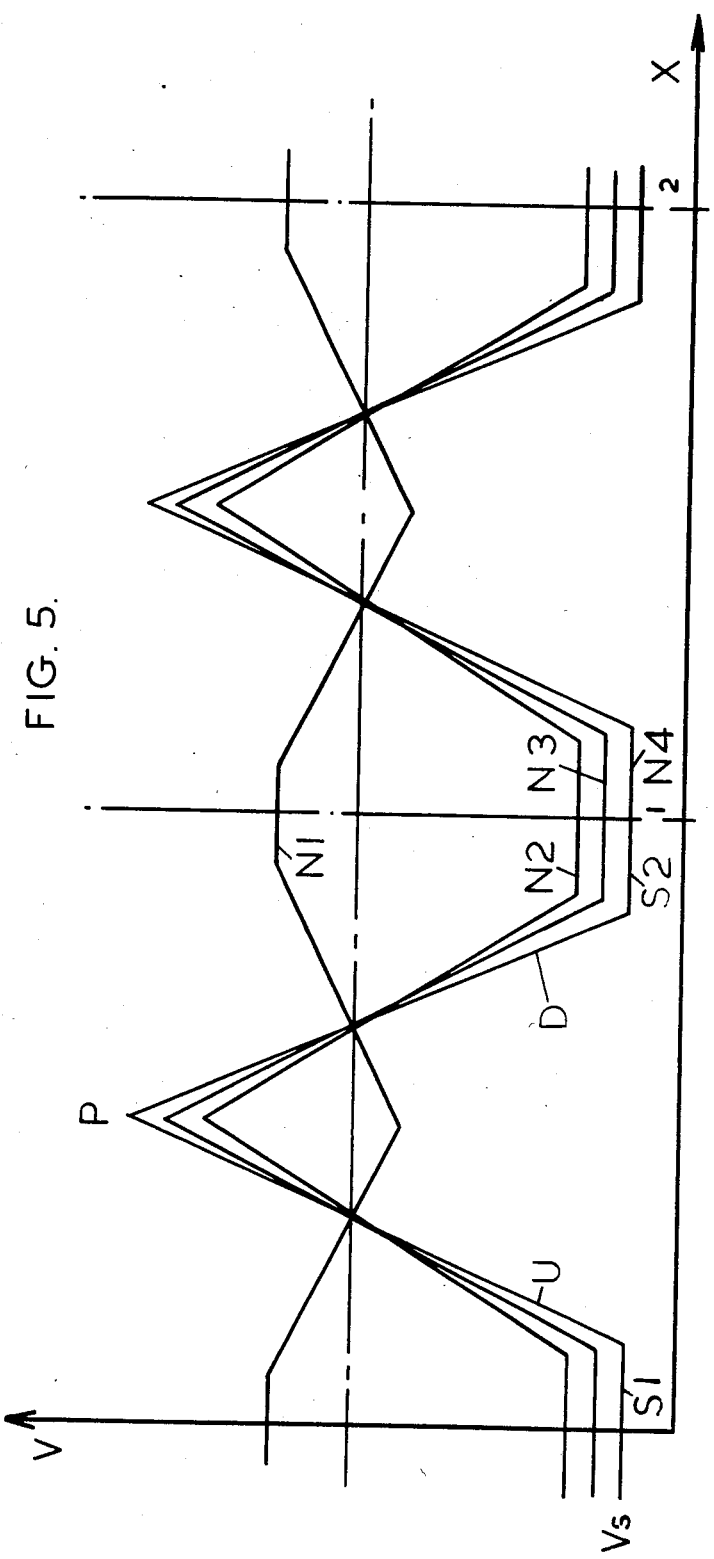

FORM-FILL-SEAL WRAPPING APPARATUS

BACKGROUND OF THE INVENTION

1. Field of the Invention

This invention relates to form-fill-seal wrapping apparatus, an example being the machine currently sold by the present applicant under the Registered Trade Mark FLOWPAK and the designation RF 255 FLOWPAK.

2. Description of the Prior Art

In each task assigned to it, the apparatus is required to wrap a succession of items which are nominally the same size. It is a feature of such apparatus that it is fitted with product size change settings which can be changed to allow items of nominally different sizes to be wrapped.

Changing settings from one wrapping task to another involves considerable effort on the user's behalf. As will become apparent hereinbelow, a simple product size change, i.e. doubling the length of the items which are to be wrapped, involves changes in speed of some machine drives but no changes in others. Those that are changed are unlikely to be changed by a simple factor.

To establish synchronism of the machine elements in the aftermath of such changes, it is conventional to provide the wrapping apparatus with mechanical drives which incorporate differential gearing, these permitting not only a setting up of the machine so that all the drives are synchronised but, also, a fine adjustment of the synchronism during routine operation of the machine.

However such differentials are complex, comprise a multiplicity of parts and are expensive to manufacture.

Changing from one wrapping task to another has hitherto been an operation performed by a technician or engineer. It is one object of the present invention to simplify the wrapping task changing procedure to such an extent that it is feasible for it to be accomplished by personnel who operate the apparatus during the wrapping tasks.

The previously proposed horizontal form-fill-seal wrapping machines employ a pair of rotary sealing jaws to effect transverse sealing of the wrapper web between successive sealing of the wrapped product items. The present inventor is aware that a sealing jaw speed which is markedly different from the wrapper speed, during the portion of the jaw cycle when the jaws are sealing together the two overlaid sheets of wrapping material, will adversely affect the seal quality. He is also aware that it is necessary to ensure that the jaws not only rotate in synchronism with the wrapping cycle but also move at substantially the speed of advance of the wrapping web during the sealing portion of the cycle, which speed will change with each wrapping task even if, in each of these tasks, the same number of items are wrapped per unit of time. Accordingly, it is another object of the present invention so to modulate the rotation of the sealing jaws that the successive product items are spaced closely together and the seal quality is not adversely affected by a speed discrepancy, as mentioned above, throughout the duration of a range of different wrapping tasks.

SUMMARY OF THE INVENTION

According to a first aspect of the present invention there is provided horizontal form-fill-seal wrapping apparatus comprising an infeed conveyor which performs in a cycle to deliver at a fixed point in the cycle successive items of a train of product items to be wrapped, means for advancing a web of wrapping medium and folding and sealing the web longitudinally around the train, and a transverse sealing means which performs in a cycle to form at a fixed point in each cycle a transverse seal in the folded web between each successive item in the train, characterised in that the apparatus comprises:

(i) a first motor, to drive the infeed conveyor, and an associated positional feedback device;

(ii) a second motor, to drive the web advancing means, and an associated positional feedback device;

(iii) a third motor, to drive the transverse sealing means, and an associated positional feedback device;

(iv) a microprocessor control device to which is inputted signals from the said feedback devices and which outputs driving signals to the said motors, and (v) means to input the control device with data representative of the unit length of the wrapping web to be used to wrap each said product item, and representative of the number of product items to be wrapped per unit of time.

According to a second aspect of the present invention there is provided apparatus for making a succession of transverse seals between upper and lower sheets of a web of wrapping material in a form-fill-seal wrapping machine, the apparatus including first and second cooperating sealing surfaces for bringing said two sheets into mutual contact, with at least the first sealing surface being mounted for cyclic movement around a locus which is a closed loop, characterised by means to modulate the cyclic movement of the first sealing surface comprising means for sensing a position of the surface at a plurality of points spaced in time around the cyclic locus, a library of positional data representative of said surface positions in a plurality of different predetermined movement modulation patterns, means for selecting one pattern from the library, and means for generating the said cyclic movement in accordance with said selected modulation pattern.

Conveniently, the first sealing surface is on a sealing jaw mounted on a shaft. The second sealing surface can be an opposed sealing jaw mounted on a parallel shaft which counter-rotates in use with respect to the shaft carrying the first sealing surface.

The modulation is conveniently achieved by control of a torque motor which generates the cyclic movement of the first sealing surface, e.g. by driving a shaft on which it is mounted and, normally, the shaft on which the second surface is mounted. In such an arrangement, the sealing surfaces are usually termed jaws. While there is normally only one sealing surface on each counter-rotating shaft, it can be arranged that each of these shafts carries two or more sealing surfaces regularly spaced around the respective shafts.

Conveniently, and usually, the infeed conveyor is a chain conveyor with spaced lugs, each of which propels a single product item to the folding means. The web advancing means conveniently comprises one or more pairs of nipping rollers to grip the edges of the folded web, and one or more of these roller pairs may be a pair of heated sealing rollers. The transverse sealing means conveniently comprises a pair of cross sealing crimp jaws. These will normally be heated. One of the jaws will often carry a web-cutting edge and in such a case, the other jaw will normally carry a corresponding anvil.

BRIEF DESCRIPTION OF THE DRAWINGS

For a better understanding of the present invention, and to show how the same may be carried into effect, reference will now be made, by way of example, to the accompanying drawings, in which:

FIG. 5 is a graph showing variation in sealing jaw velocity V in one cycle of rotational movement X thereof.

DETAILED DESCRIPTION

Figure 1:
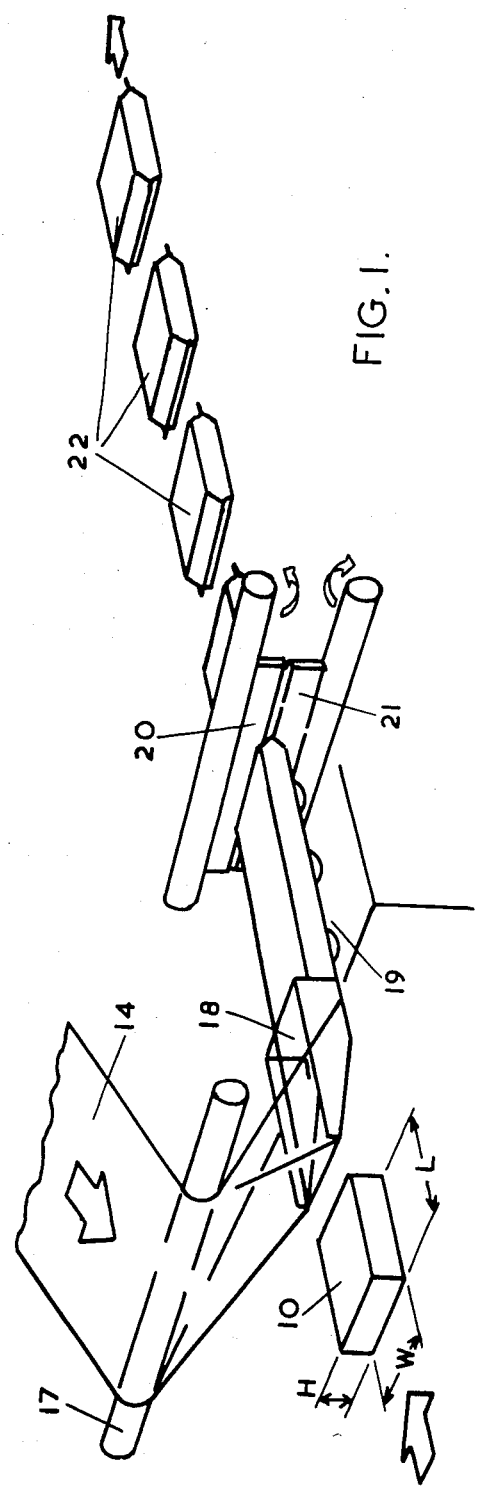
FIG. 1 is a perspective view of certain of the major components of a form-fill-seal wrapping machine.
Figure 2:
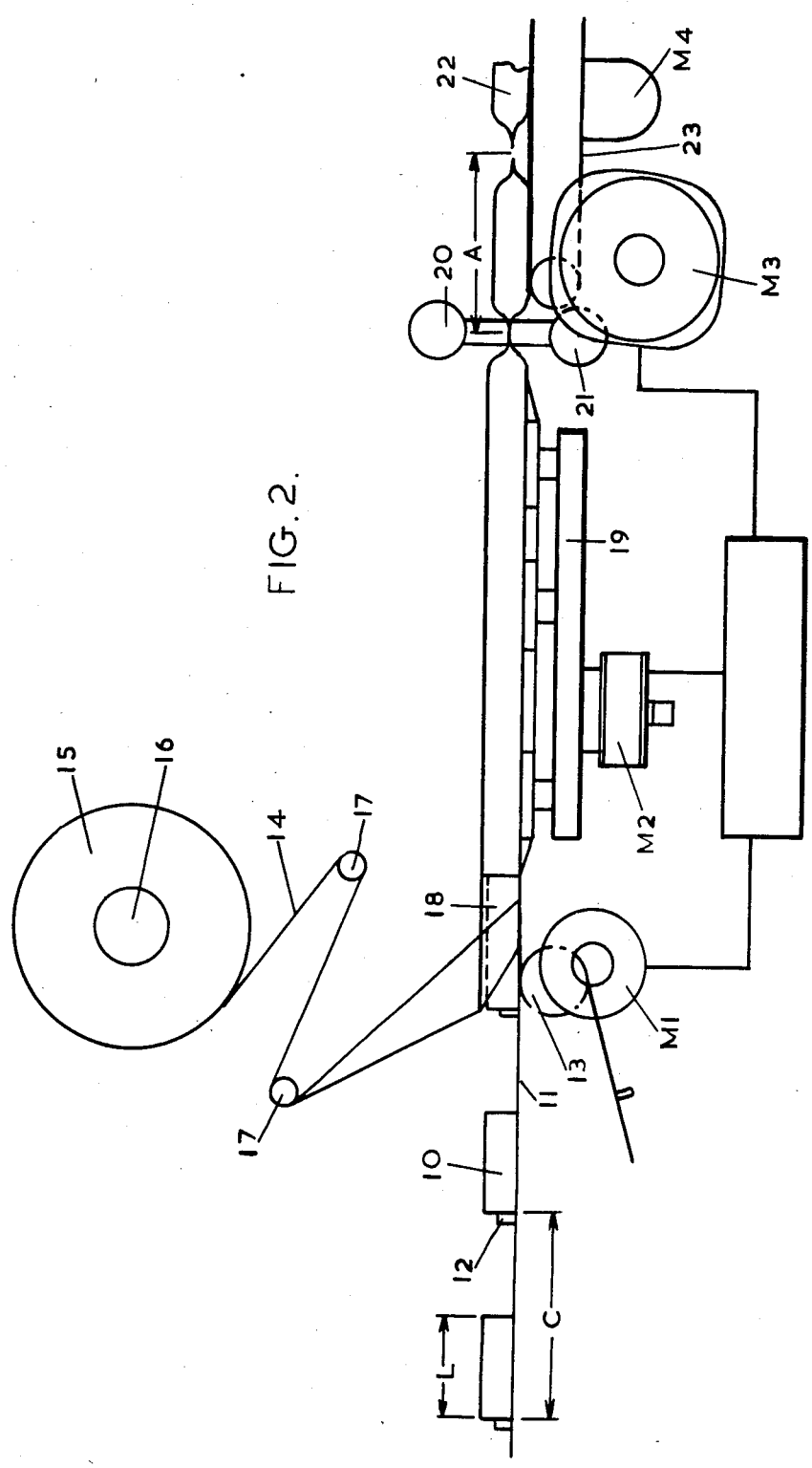
FIG. 2 is an elevation of a machine such as is shown in FIG. 1, and showing schematically driving motors and a common microprocessor control device.

Referring to FIGS. 1 and 2, a train of individual product items 10 of length L, height H and width W is propelled, along an infeed path defined by a surface 11, by the lugs 12, spaced at intervals C, of an endless loop infeed conveyor 13. There is only one product item 10 to each lug 12 but each product item may comprise more than one product element, for example, the item could be a cardboard tray on which are six chocolate-coated biscuits. The conveyor 13 is driven by an infeed conveyor electric motor assembly M1. One cycle of the infeed conveyor corresponds to forward movement of the conveyor by one lug spacing C. This spacing can be changed, for example, between settings of 8,12 and 16 inches (20,30 and 40 cms).

A web 14 of wrapping material is pulled by its own longitudinal tension from a reel 15 carried on a shaft 16. The web travels over a pair of tensioning rollers 17 to a folding box 18, in the path of the product items 10 issuing from the infeed conveyor 13, which folds the web around the transverse sides of each product item. Downstream of the folding box 18 is a web propelling and sealing unit 19 which pulls the web 14 from the reel, advances the web 14 through the folding box 18 and also makes a continuous, longitudinal seal beneath the enwrapped product items, so that the product items lie within a tube of the wrapping material 14. The unit 19 is driven by a motor assembly M2.

Downstream of the unit 19 is a pair of sealing jaws comprising an upper jaw 20 and a lower jaw 21 and caused to rotate, in the directions shown by the arrows, by a motor M3. When the upper and lower jaws face one another as shown in FIGS. 1 and 2, they press together opposed upper and lower sheets of the tube of wrapping material which extends between the jaws whereby the sheets are joined in a transverse seal. Heating means (not shown) in the jaws can heat the wrapping material to secure better mutual bonding of the opposed sheets and a stronger transverse seal, and a cutting edge (not shown) in one of the jaws and an anvil (not shown) in the other can co-operate to part the web to provide individually wrapped articles 22. Operation of the jaws 20 and 21 is further described hereinafter. Downstream of the jaws is a take-away conveyor 23 driven by a motor assembly M4.

The construction of the infeed conveyor 13, folding box 18, sealing unit 19 and jaws 20 and 21 will be familiar to those skilled in the art.

Figure 3:
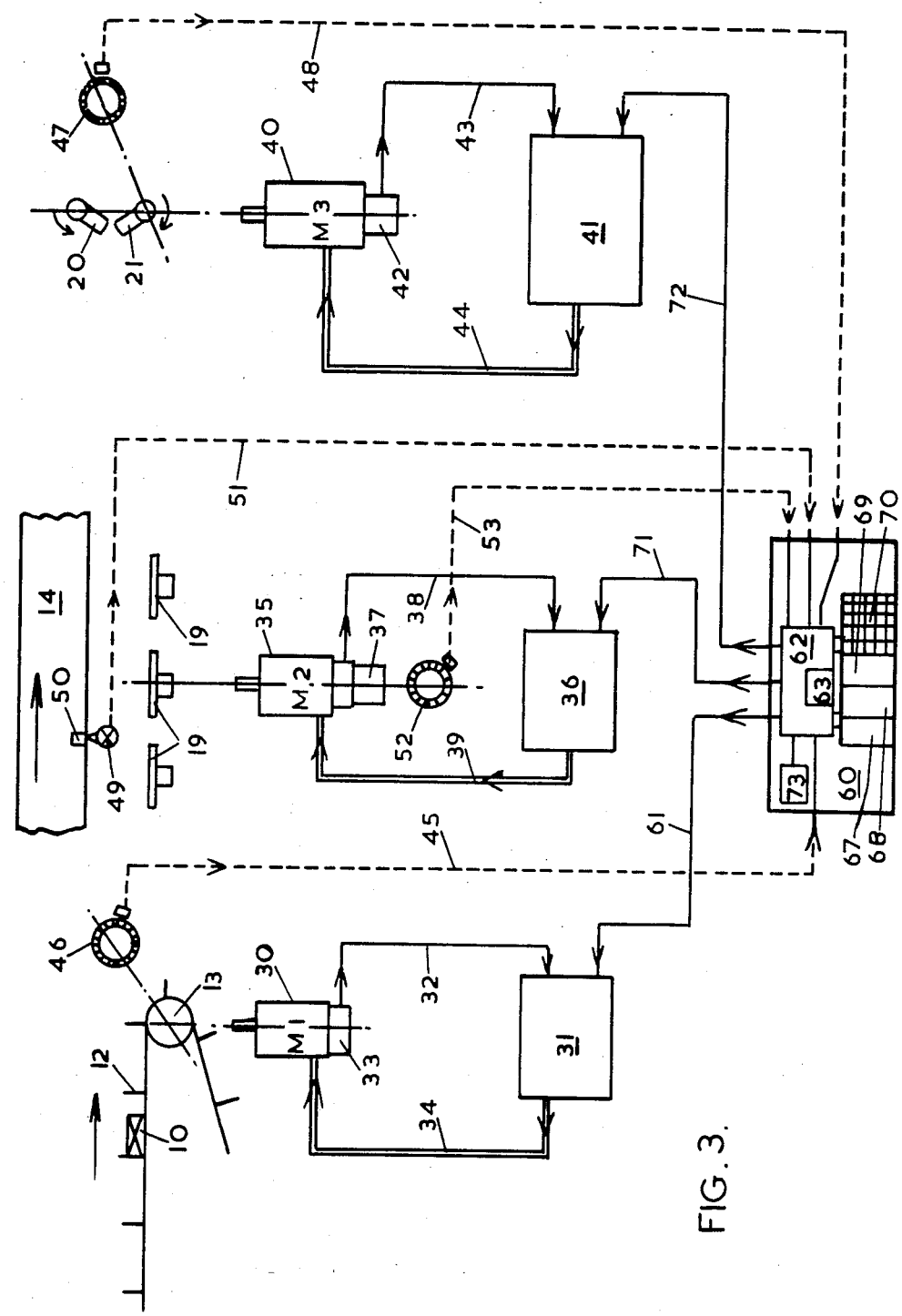
FIG. 3 is a block diagram showing certain major elements of the electronic machine control.

Referring now to FIG. 3, there is shown schematically the motor assembly M1 driving the infeed conveyor 13, being actuated by a drive signal transmitted to the motor from a microprocessor controller 60 along a line 61. The assembly M1 comprises a direct current motor 30 and a servo drive unit 31 which compares the drive signal with a signal received along a line 32 from a tachometer 33 and transmits to the motor 30 along a line 34 an appropriate power signal to drive the motor.

Similarly, the motor assembly M2 comprises a direct current motor 35, drive unit 36, tachometer 37 and line 38 connecting it to the drive unit 36, and power signal line 39. It is actuated by a drive signal transmitted along a line 71. The motor assembly M3 comprises a direct current motor 40, drive unit 41, tachometer 42 and line 43 connecting it to the drive unit 41, and power signal line 44. It is actuated by a drive signal transmitted along a line 72.

The machine control 60 is supplied along a line 45 with information, in the form of pulses, as to the cyclic position of the lugs 12 of the infeed conveyor 13, from a shaft encoder 46 mounted to a shaft of the infeed conveyor. During advance of the conveyor by 4 inches the encoder generates 300 pulses, one of which is a distinctive zero pulse. Another shaft encoder 47 on a shaft of the jaw pair 20 and 21 supplies the control 60 along a line 48 with information as to the cyclic position of the jaws. During each jaw revolution, the encoder generates 2000 pulses one of which is a distinctive zero pulse. A photo electric cell (PEC) 49 is located such as to detect any indexing mark 50 which may be provided for the purpose on the wrapping web 14, and input the machine control 60 along the line 51. Further, a shaft encoder 52 mounted to the tachometer 37 of the motor M2 inputs to the microprocessor controller 60 along a line 53 information, in the form of pulses, about the advance of the shaft of the motor M2. During each revolution of the motor shaft the encoder generates 100 pulses, but none of these is a distinctive zero pulse. Instead, a zero is established by the signal from the PEC generated by a registration mark on the web. If the web is not printed, a zero as such is not needed.

When the apparatus is in operation to wrap N items per minute the following events are required to take place in each period of time of 1/N minutes:

(i) the infeed conveyor 13 to advance by a distance C;

(ii) the seal jaws 20 and 21 to execute one complete rotation;

(iii) the motor M2 to advance the web 14 by one wrapper unit length W, (and, in a case where the wrapper is printed, the spot 50 to be again in registry with the PEC 49).

These events are required to be constantly synchronised with each other.

The encoder 46 constitutes a product infeed position sensing and feedback means, the encoder 47 constitutes a seal position sensing and feedback means, and the encoder 52 a web position feedback device. The PEC 49 constitutes unit web length data input means. The microprocessor 60 maintains synchronism of the operation of the wrapping machine components. In one scheme of operation, an encoder comparitor 62, prompted by a pulse generator 63, generates, by comparison of the information it receives on the input lines 45, 48 and 51 with stored data, and in accordance with a program, a first drive signal in the line 61, a second drive signal in the line 71 and a third drive signal in the line 72. As an alternative, the comparitor 62 can be prompted by pulses generated by the product infeed position encoder 46 to generate appropriate synchronised drive signals 71 and 72 for motors M2 and M3.

Precise adjustment of synchronism of the infeed conveyor 13, the web advance, and the operation of the sealing jaws 20 and 21, can be secured by manual intervention while the machine is running. This is shown schematically by elements 67 and 68 respectively of the microprocessor machine control 60. In contrast, in a conventional machine, an operator will need occasionally, and invariably on starting a new wrapping task, to stop the machine in order to adjust the PEC, and reposition the web and product infeed mutually in phase.

If product items are to be wrapped which are much longer than the minimum infeed lug spacing it will still be possible to handle them by increasing the lug spacing, as mentioned above. The element 69 of the machine control is an infeed pitch ratio compensator for inputting the microprocessor which can accommodate changes of 50% and 100% in infeed pitch. For example, a basic pitch of 8 inches can be changed to 12 inches or 16 inches and, of course, modification of the compensator 69 would make other ratios possible, of which the most likely further requirement would be a pitch of 24 inches.

The element 70 of the machine control 60 enables input to the microprocessor of a desired unit web length of the wrapper material, and is useful when the wrapper web is not register printed.

The drive signal to the jaws 20 and 21 is modulated, in accordance with the description below and FIG. 5, by the machine control 60.

FIG. 5 shows how the velocity V of the sealing surface varies with its position X through one complete rotation, i.e. one cycle, of the jaw. Over an initial portion S1 of the cycle the velocity is constant, then in a portion U it rises to a peak velocity P, then falls in a similar portion D of the cycle to the final portion S2 of the cycle wherein the velocity is constant and equal to that in portion S1. Taken together, the portions S2 and S2=S cover about 60° of the 360° cycle, it being during the constant velocity portions when the jaws are in contact with the wrapping material.

The constant velocity Vs in portion S is set by the microprocessor control 60 to be equal to the wrapper speed through the jaws 20 and 21. The magnitude of the peak velocity P is determined by the need for the jaws to execute exactly one rotational cycle with passage of each wrapper length through them, but it may be necessary to decrease the jaw speed very rapidly from a high speed at the commencement of portion S in order that the jaws do not foul the front edge of a next following item in the train just upstream of the transverse sealing jaws. Any necessary jaw acceleration should be no higher than is necessary in the circumstances, in order to keep the torque demand of the jaws to a minimum.

The machine control has available to it a library 73 of, say, twenty four patterns of jaw modulation, and one of these is selected as described hereinafter according to the characteristics of the wrapping task which the machine is performing. In FIG. 5, only four patterns N1,N2,N3 and N4 are shown.

The take-away conveyor 23 should run at a speed which is fast enough to carry wrapped articles 22 away from the jaws 21,22 without their obstructing following articles, but not so fast as to damage the articles. This is conveniently achieved by slaving the motor M4 to the web advance drive unit 36.

To exploit the full potential of the jaw modulation the jaws can be mounted on a housing which is slidable up and down to align the sealing plane of the jaws with the mid-height of the items being wrapped. It can be arranged that height adjustment of the housing takes place automatically as soon as the height H of the product item is inputted to the microprocessor 60.

Figure 4:
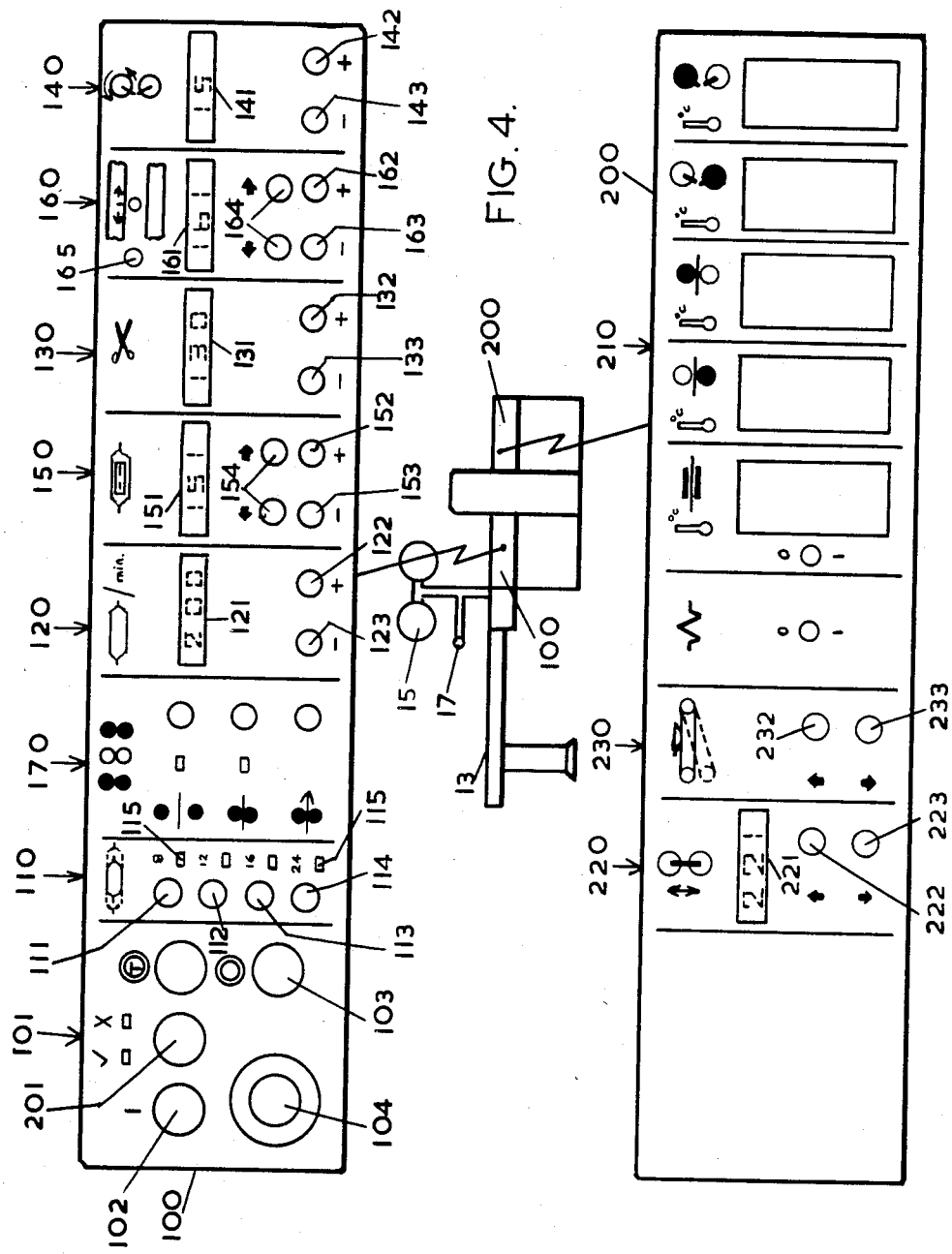
FIG. 4 is a front view of a control and display panel of the wrapping machine.

Practical use of the illustrated apparatus will now be described further with particular reference to FIG. 4 of the drawings which shows a schematic side elevation of the wrapping machine, first 100 and second 200 portions of a control panel of the machine, and link lines to show where the panel portions are located on the machine.

A first area 101 of the portion 100 has a conventional array of master controls, a start button 102, stop button 103 and emergency stop button 104.

In the following description, the example is taken of the wrapping of a chocolate bar of length 80 mm, width 40 mm and height 24 mm, at a rate of 200 bars per minute. The necessary length of wrapping material for such bars is computed by adding together the length of the product, the width of the sealing jaws 20 and 21 and 1.25 H where H is the product height. Thus, in the present case, with the sealing jaw width of 20 mm, the required length of wrapping material is 130 mm so that, for 200 bars per minute, a length of 26 meters of wrapping material is required for every minute of the machine operation.

With bars of this length, it is appropriate to set the pitch of the infeed conveyor to 8 inches. This pitch setting is inputted to the microprocessor 60 by pushing the button 111 marked "8" on a second control area 110 of the first portion 100 of the panel. Buttons 112,113,114 provide alternative settings of 12,16 and 24 inches, and a row of displays 115 identifies the chosen setting.

Next, the display 121 in the pulse generator area 120 is adjusted either upwardly by pushbutton 122 or downwardly by pushbutton 123 to read the number of items to be wrapped per minute, i.e. "200", and so input the microprocessor 60 with data indicative of the desired wrapping rate.

Next, the desired cut-off length of the wrapper material, computed above to be 130 mm, is set in a similar fashion at area 130 of the panel 100, on the display 131 using an increase button 132 or a decrease button 133 as appropriate. With a register printed web it is possible for this step to be omitted but the display could be used to show the length of the web between registration marks.

Next, one modulation pattern N for the movement of the jaws 20 and 21 is selected from the library of patterns held by the microprocessor 60, and inputted by use of increase button 142 or decrease button 143 to step through numbered patterns until the required one (here: 15) is displayed at 141 on area 140 of the panel portion 100.

The effect of making these settings is to fix what each of the motors M1,M2 and M3 has to do in unit time.

Next, the displays in areas 150 and 160 of the control panel are set to display numerical values characteristic of proper synchronism of the three motor cycles in the particular wrapping task which is to be performed, and the settings are achieved using increase or decrease buttons 152,153,162,163 as shown and as described with reference to areas 120,130 and 140 of the control panel. The display 161 in area 160 of the predetermined characteristic number should ensure that any printing on the wrapper material is "in phase" with the product items, and the setting on the display 151 in area 150 is to secure that the sealing jaws rotate "in phase" with the flow of product items so that the wrapping material is sealed cleanly between items and the jaws do not contact the items themselves. The feed of wrapper web being already synchronised with the product items, this will have the result that the transverse seal is at the intended point on the printed web. Shifting to different numbers one at a time (using the push buttons 152,153,162,163 as described above) alters the phase relationship progressively, so minor departures from complete synchronism can be corrected by small changes in the displayed numbers. There is also provided for each display 151,161 a further pair 154,164 respectively of pushbuttons for stepping through the displayed numbers at a faster rate.

In a case where the web is unprinted, the display 161 has no significance and it is therefore appropriate to remove it. The microprocessor is commanded to function without reference to any signal from the PEC 49, and the display 161 is rendered dark, by depressing a switch 165.

The area 170 contains actuating buttons for controlling a pneumatic actuator of the opening and closing movements of the web advance and longitudinal sealing means, as will be known generally to those skilled in the art.

The numerically unreferenced displays and controls on the second panel 200 in an area 210 of the panel relate to temperature settings in the wrapping apparatus and need not be described herein.

The display 221 in the area 220 is of the height of the sealing plane of the jaws 20 and 21. The height is changed by an actuator (not shown) itself actuated by a pushbutton pair 222 and 223. Normally, the height will be set at a level which is at mid-height of the items to be wrapped, so that the transverse seals protrude from the ends of the items at mid-height thereof.

In the area 230 a pushbutton 232 is used to raise the take-away conveyor 23 and another button 233 to lower it.

Once all the displayed settings are appropriate, the wrapping material is fed through the machine and a "SET" button 201 is pressed so as to bring all functions of the wrapping apparatus into synchronism with each other. The machine "START" button 102 is pressed and the wrapping action of the machine will then commence at a gradually increasing speed controlled by the machine control 60, all the while maintaining synchronism of the various machine elements. If the finished product packages issuing from the machine are not exactly to requirements, any of the settings 121,131,141,151 and 161 can be trimmed while the machine is running, by the above-mentioned increase and decrease buttons.

It is envisaged that the machine control 60 will include a memory into which can be inserted all the various settings characteristic of a particular wrapping task, and each such memorised task would be identified by a unique code. Means would be provided for inputting characteristic codes so that the machine would then be able to set itself to the particular product task identified.

I claim:

1. Horizontal form-fill-seal wrapping apparatus comprising an infeed conveyor which performs in a cycle to deliver at a fixed point in the cycle successive items of a train of product items to be wrapped, means for advancing a web of wrapping medium and folding and sealing the web longitudinally around the train, and a transverse sealing means which performs in a cycle to form at a fixed point in each cycle a transverse seal in the folded web between each successive items in the train, characterised in that the apparatus comprises:
   i. a first motor, to drive the infeed conveyor, and an associated positional feedback device;
   ii. a second motor, to drive the web advancing means, and an associated positional feedback device;
   iii. a third motor, to drive the transverse sealing means, and an associated positional feedback device;
   iv. a microprocessor control device to which is inputted signals from the said feedback devices and which outputs driving signals to the said motors; and
   v. means to input the control device with data representative of the unit length of the wrapping web to be used to wrap each said product item, and representative of the number of product items to be wrapped per unit of time.

2. Apparatus as claimed in claim 1 wherein the positional feedback device associated with the first and third motors generates a distinctive zero pulse at the commencement of each cycle.

3. Apparatus as claimed in claim 1 wherein the feedback devices are shaft encoders.

4. Apparatus as claimed in claim 1 wherein the means to input the control device with unit web length data comprises means for detecting a registration mark on each unit web length.

5. Apparatus as claimed in claim 1 wherein the control device has a library of patterns of modulation of the cyclic movement of the transverse sealing means, and means for selecting one of said patterns from the library.

6. Apparatus as claimed in claim 1 further comprising a take-away conveyor for wrapped items downstream of the transverse sealing means, which conveyor is slaved from the second motor drive and thereby caused to advance at a speed which is in proportion to the speed of advance of the wrapping web.

7. Apparatus as claimed in claim 1 wherein the transverse sealing means is mounted for vertical movement, an actuator is provided for effecting such movement, and sensing and display means is provided to permit the sealing plane of the sealing means to be brought to the horizontal mid-plane of the product items to be wrapped.

8. Apparatus for making a succession of transverse seals between upper and lower sheets of a web of wrapping material in a form-fill-seal wrapping machine, the apparatus including first and second cooperating sealing surfaces for bringing said two sheets into mutual contact, with at least the first sealing surface being mounted for cyclic movement around a locus which is a closed loop, characterised by means to modulate the cyclic movement of the first sealing surface comprising means for sensing a position of the surface at a plurality of points spaced in time around the cyclic locus, a library of positional data representative of said surface positions in a plurality of different predetermined movement modulation patterns, means for selecting one pattern from the library, and means for generating the said cyclic movement in accordance with said selected modulation pattern.

* * * * *